March 25, 1930.  M. A. KAPELUCHNIKOFF  1,752,092
EXPANSIBLE BORING TOOL FOR HYDRAULIC BORING APPLIANCES
Filed Oct. 2, 1929
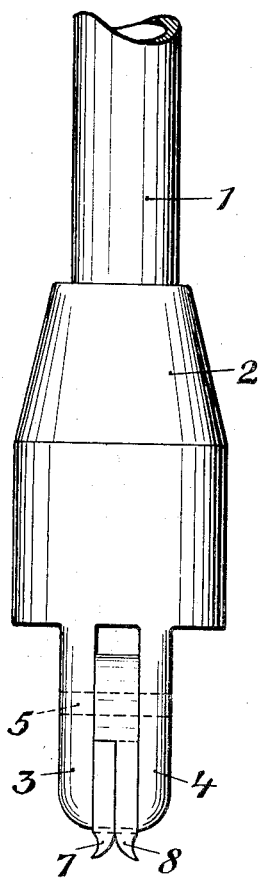
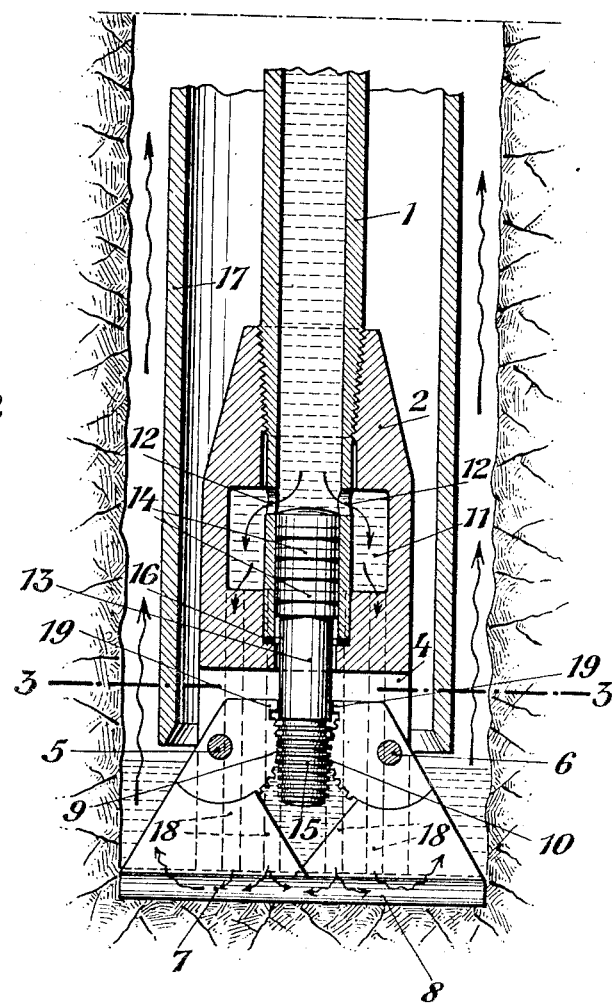
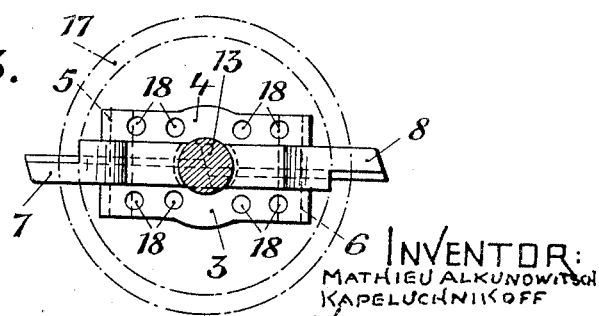
INVENTOR:
MATHIEU ALKUNOWITSCH
KAPELUCHNIKOFF
BY
ATTORNEYS Patented Mar. 25, 1930

1,752,092

UNITED STATES PATENT OFFICE

MATHIEU ALKUNOWITSCH KAPELUCHNIKOFF, OF BAKU, RUSSIA

EXPANSIBLE BORING TOOL FOR HYDRAULIC BORING APPLIANCES

Application filed October 2, 1929, Serial No. 396,684, and in Germany September 23, 1927.

This invention relates to an expansible boring tool for hydraulic boring appliances. In boring tools of this kind satisfactory lubrication of the working surfaces of the tool is absolutely essential, but is usually not easy to obtain. The lubrication is always effected with water, which at the same time serves for conveying the boring material.

Now the object of the invention is to provide a boring tool which is simple in construction and the cutting surfaces of which are satisfactorily cooled or lubricated when at work, and in which at the same time it can be at once determined from the working position whether the requisite cooling and also the spreading of the tool and the scavenging are being effected.

The new boring tool is characterized by the fact that for the attainment of the object indicated above, the cutter head that carries the rotatably supported cutting jaws or stocks, in the part thereof that is screwed on to the boring tube, has an annular recess connected with passages opening into the neighbourhood of the cutting edges, and that the boring tube has apertures opening into the recess, and the latter can be covered and uncovered by a piston which is slidable in the boring tube under the action of the motive fluid, and the free lower end of which is provided with teeth which co-operate with teeth on the cutting jaws.

One constructional example of the invention is illustrated in the accompanying drawings in which Figure 1 is a view of the boring tool, Figure 2 a central longitudinal section through a tool occupying the working position in a boring tube, and Figure 3 a section on the line 3—3 in Figure 2.

On to the tube 1 to be connected with the boring tube and set in rotation in any suitable manner by means of a liquid is screwed a cutter head 2, which is forked at its free end. The flattened prongs 3 and 4 of the fork have trunnions 5 and 6, on which cutting jaws 7 and 8 respectively are rotatably supported. The cutting jaws 7 and 8 are provided with toothed segments 9 and 10 respectively, concentric with their trunnions and facing one another. The upper portion of the cutter head 2 is formed with an annular recess 11, into which the tube 1 extends. Near to the upper bounding wall of the recess 11 there are provided in the tube 1 holes 12 by which the interior of the tube 1 can be placed in communication with the annular chamber 11. In the under part of the tube 1 is slidably supported a piston 13, which is provided for sealing purposes with piston rings 14, and carries at its lower end teeth 15, which co-operate with the toothed segments 9 and 10 of the cutting jaws 7 and 8. Between the lower end of the tube 1 and the cutter head 2 is provided a packing 16 by which any loss of liquid is prevented.

When using the new tool, the latter is introduced into the boring tube 17, along with its driving apparatus, by means of suitable rodding or a cable. When the liquid that serves to drive the tool flows in, it passes, after setting the driving machine in rotation, through the tube 1, and presses upon the upper end of the piston 13, whereby the latter is displaced downwards into the position illustrated in Figure 2, so that now the liquid can flow through the apertures 12 in the tube 1 into the annular chamber 11. The chamber 11 communicates with passages 18, which lead through the parts 3 and 4 of the cutter head to the cutting edges of the jaws 7 and 8. At the same time owing to the downward movement of the piston 13, in consequence of the co-operation of the teeth 15 with the teeth 9 and 10, the jaws 7 and 8 are opened out, so that they assume the position illustrated in Figure 2 and produce in the ground a hole of the desired diameter. The material loosened by the jaws 7 and 8 is expelled by the water supplied through the tube 1, the holes 12, the annular chamber 11 and the passage 18, after this water has first served for driving the apparatus and then for cooling or lubricating the cutting jaws.

By the commencement of the circulation of the liquid it is indicated to the person in charge of the apparatus that everything is in order below ground, and the tool is working in the desired manner.

When drawing the tool up, the bevelled external surfaces of the cutting jaws 7 and 8 come into contact with the correspondingly bevelled lower edge of the tube 17, whereby they are closed up like scissors and at the same time the piston 13 is displaced upwards under the action of the teeth 9, 10 and 15, so that the holes 12 in the tube 1 are now closed by the piston 13.

I claim:

1. A boring tool for sinking shafts comprising, in combination, a cutter head having bevelled prong-like jaws, cutting blades supported between said jaws, said jaws extending so as to take up the forces arising in a horizontal plane and relieving thereby the trunnions of the jaws, said cutter head having an annular recess therein, a tube, a piston movable in the tube, means controlled by said piston for spreading the cutting blades apart, and stops on said blades engaging said piston to limit the expansion of the blades.

2. A boring tool for sinking shafts comprising, in combination, a boring tube having side openings near the end thereof, a piston mounted within said tube adapted to move above and below said openings in the tube to close and open said openings, a cutter head mounted around the end portion of the boring tube and secured to the outside of said tube above the side openings therein, said cutter head having an annular recess in communication with the side openings in the boring tube, jaws integral with the cutter head and extending below the boring tube, extensible boring blades pivotally mounted between said jaws, means for extending said blades upon downward movement of the piston in the boring tube comprising a rod connected with the piston and having teeth thereon and circular toothed portions on the boring blades having the pivots of said blades as centers, the teeth of said piston rod engaging the teeth of said blades, whereby said blades are extended when the piston moves downward, and said cutter head and jaws having openings extending from the annular recess in said cutter head to the bottoms of said jaws.

In testimony whereof I have affixed my signature.

MATHIEU ALKUNOWITSCH KAPELUCHNIKOFF.